June 26, 1923.
F. B. PURCHAS
FRUIT GRADING MACHINE
Filed Oct. 31, 1922
1,460,270
3 Sheets-Sheet 3
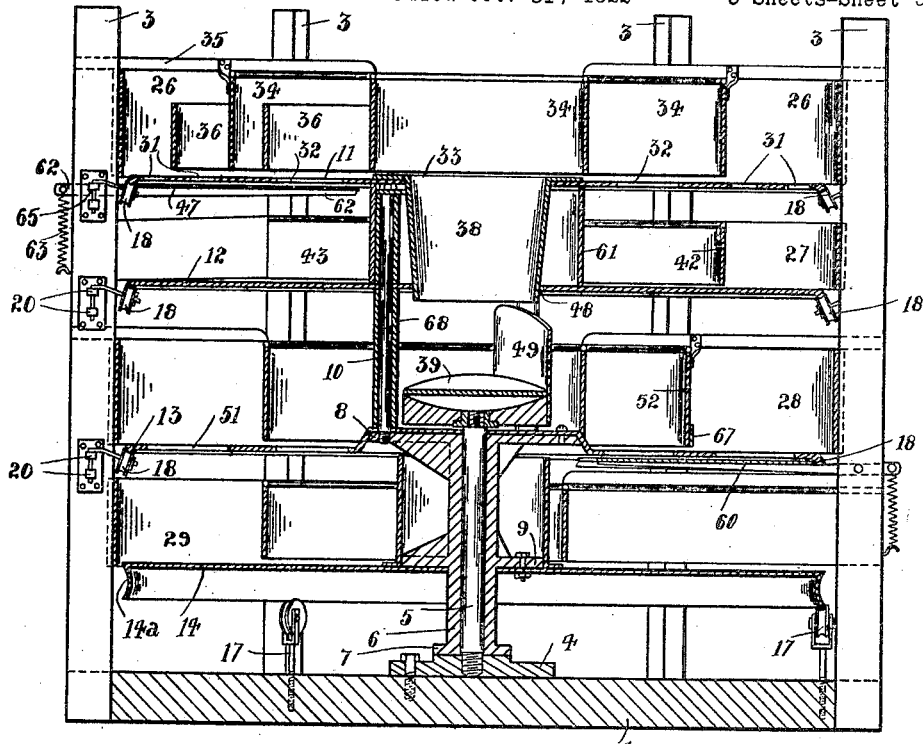
Fig. 7.
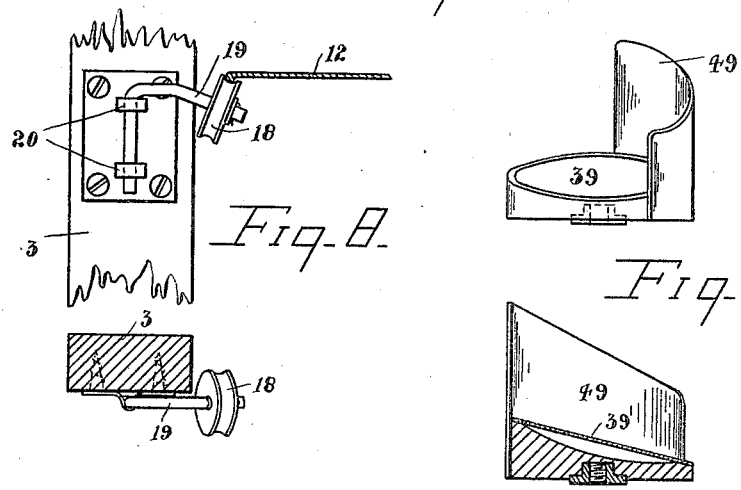
Fig. 8.
Fig. 9.
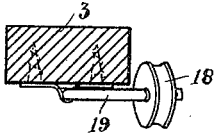
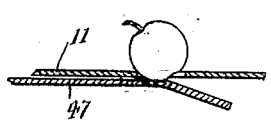
Fig. 10.

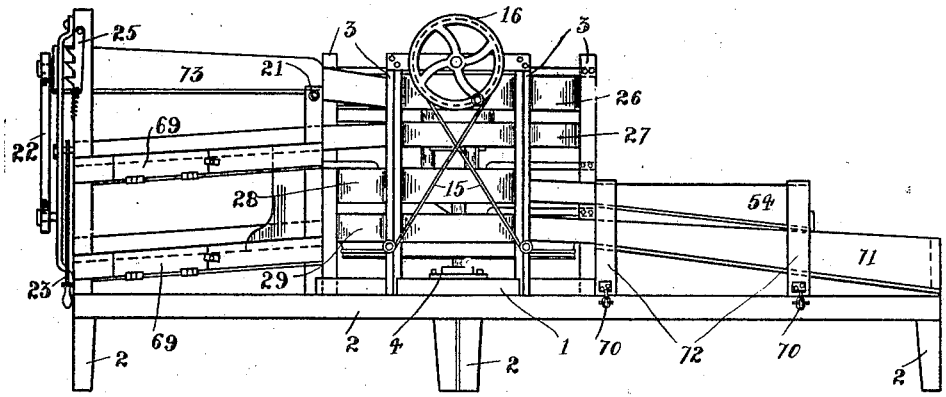
Fig. 1.
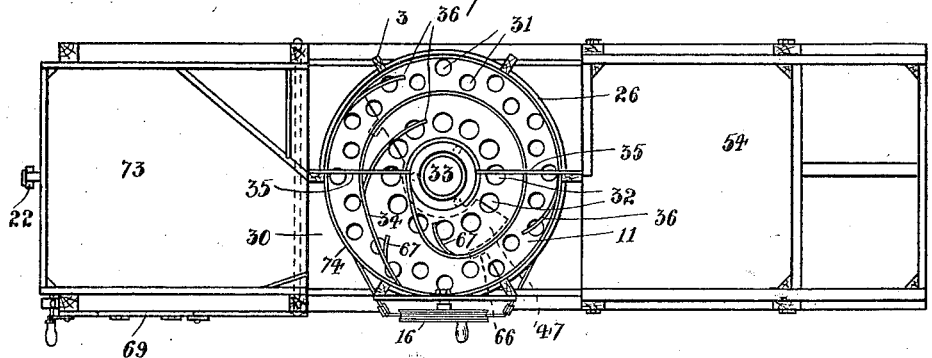
Fig. 2.
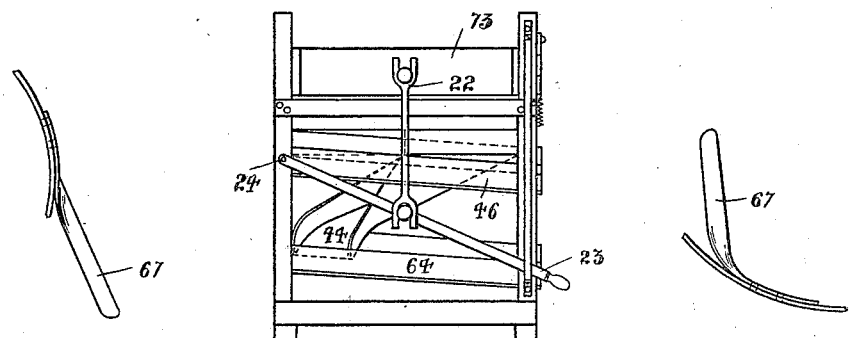
Fig. II.  Fig. 3.  Fig. IV.

Patented June 26, 1923.

1,460,270

UNITED STATES PATENT OFFICE.

FREDERICK BOWMAN PURCHAS, OF HITCHIN, ENGLAND.

FRUIT-GRADING MACHINE.

Application filed October 31, 1922. Serial No. 598,142.

*To all whom it may concern:*

Be it known that I, FREDERICK BOWMAN PURCHAS, a subject of the King of Great Britain and Ireland, residing at Hitchin, in the county of Hertfordshire, England, have invented certain new and useful Improvements in Fruit-Grading Machines, of which the following is a specification.

This invention relates to improvements in machines for grading fruit, that is to say, for sorting apples or other fruit into various sizes.

According to the present invention a fruit grading machine is provided which occupies comparatively little space, can be worked if desired by hand by one man, and can be built at no great cost.

The fruit is graded by passing through rotating discs provided with suitable openings of various sizes, the fruit being either collected after passing through the openings or being passed on to a further grading disc.

The fruit which passes on to a rotating grading disc is guided across the disc by means of a stationary guide wall. The fruit may be passed across the grading disc either from the outside towards the centre or from the centre towards the outside. The grading disc is surounded by a stationary retaining wall except where the fruit passes on to or off the grading disc. If the fruit is fed on to the grading disc from the outside a central hole is provided in the grading disc, through which passes the fruit which is too large to pass through the other holes in the grading disc. The holes in the grading disc may be arranged in two substantially concentric girdles, the holes in the two girdles being of different size, and the fruit being caused to pass first over the girdle of smaller holes and then over the girdle of larger holes. The guide wall provided in this case is substantially in the form of a volute, which runs, for example, from the outside of the grading disc first across the outer girdle of holes, then part-way round between the two girdles of holes, and then across the inner girdle. The fruit which is too large to pass through either set of holes is guided by the volute shaped guide towards the central hole through which it passes. Beneath the grading disc is arranged a rotating collecting disc on to which the fruit that passes through the grading holes in the disc above and from this collecting disc the graded fruit is caused to pass by means of a stationary volute shaped guide wall, so arranged and shaped that the fruit which has passed through one girdle of holes in the disc above falls on one side of the guide wall, while the fruit passing through the other girdle of holes falls on the other side of the guide wall, the two sizes of fruit being passed off the collecting disc by means of the guide towards separate receptacles.

The collecting disc has a central hole through which passes the fruit falling through the central hole in the grading disc above and below the collecting disc may be provided a second grading disc constructed and operating in a similar manner to the first grading disc, except that in this case the fruit to be graded by it passes from the centre outwards towards the edge. Below the second grading disc in turn may be provided a second collecting disc with which co-operates a guide wall in substantially the same manner as described with reference to the first collecting disc.

Suitable means are provided for causing the fruit to move towards the holes in the said grading discs and for ensuring that any fruit which may lodge in the said holes, but is too large to pass through them, is lifted out and moved away from the holes before the fruit reaches the guiding walls crossing the rotating discs, so that the fruit may not be caught between the edges of the holes and the guiding walls. Suitable means are further provided for ensuring that the fruit shall not be damaged by dropping from one disc to another.

In conjunction with the machine constructed as described are provided an adjustable hopper for feeding the fruit into the machine at the rate desired, and also means for conveying the graded fruit to the several receptacles therefor.

Further details of the invention are described below in connection with the accompanying drawings, which illustrate a complete grading machine for sorting apples into five different sizes. In these drawings—

Fig. 1 is a side elevation of the machine;

Fig. 2 is a plan view,

Fig. 3 is an end elevation from the left-hand side in Fig. 1,

Figure 4:
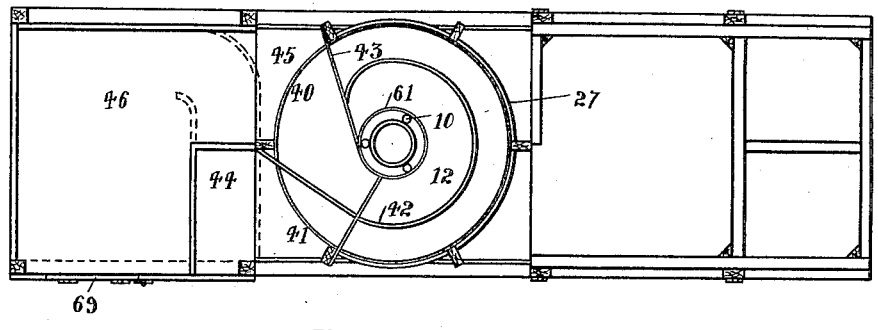
Figure 5:
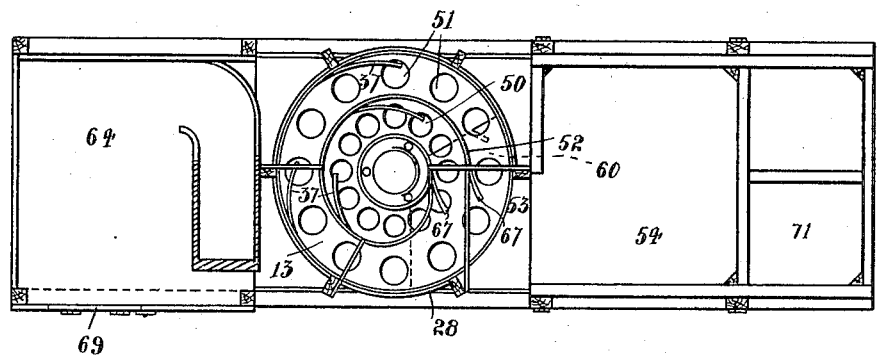
Figure 6:
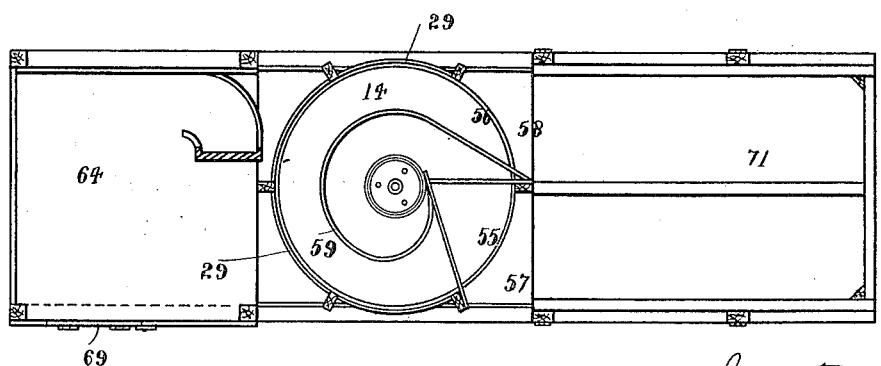

Fig. 4 is a sectional plan view on the line A. B. Fig. 1,

Fig. 5 is a sectional plan view on the line C. D. Fig. 1,

Fig. 6 is a sectional plan view on the line E. F. Fig. 1,

Fig. 7 is a sectional elevation on an enlarged scale illustrating the rotating portion of the machine and the frame in which it is mounted, Fig. 8 is a detail on an enlarged scale of one form of bearing for the rotating discs, Fig. 9 is a detail on an enlarged scale showing in two views at right angles to one another means for guiding the fruit as it falls on to the second grading disc, Fig. 10 is a detail view showing the means for lifting the fruit from the holes in the grading disc.

Figs. 11 and 12 are detail views of additional means for the same purpose.

On a base 1, which in Fig. 1 is shown standing on a supporting frame 2 are provided six uprights 3 substantially in the form of a circle, within which the rotating portion of the machine is mounted. Upon the base 1 is bolted a boss 4 for carrying a vertical spindle 5. Over this spindle is dropped a sleeve 6 having at the bottom a bearing flange 7, at the top a flange 8 and midway a flange 9. In the upper flange 8 are mounted three equally spaced supports 10, upon which are carried the top disc or first grading disc 11, and the second disc or first collecting disc 12. The third disc or second grading disc 13 is mounted on the flange 8, and the fourth disc 14 is mounted on the flange 9. The disc 14 is provided with a grooved flange or edge 14ª, round which passes a cable 15 for driving the rotating parts, the cable passing over a hand wheel 16 (Fig. 1) mounted between two uprights 3 for driving the machine. The flange 14ª of the disc 14 rests upon pulleys 17 mounted in the base 1 of the machine, and the edges of the remaining discs 11, 12 and 13 are supported by pulleys 18 mounted on the uprights 3. One method of mounting these pulleys 18 is illustrated in Fig. 8. In order to facilitate the removal of the rotating discs, in order, for example, that they may be replaced by rotating discs having holes of a different size or sizes, the pulleys 18 are mounted on shafts 19 bent substantially at right angles and carried in bearings 20 secured to the uprights 3, so that the pulleys with their shafts 19 can be turned about a vertical axis to bring them out of the way of the rotating discs below. The normal direction of rotation of the machine moves the pulleys and their axles 19 into the position shown in Fig. 8, with the horizontal portion of the axle lying against the uprights 3.

At the left-hand side of the machine in Fig. 1 is seen the hopper 73 pivoted to the frame 21, and capable of being lifted at the other end by means of a rod 22 connected with a hand lever 23 (Fig. 3) pivoted at 24 on the frame. The angle at which the hopper 73 is inclined can be regulated by means of a spring controlled rack 25 pivoted on the frame of the machine.

Surrounding the discs 11, 12, 13 and 14 are circular walls 26, 27, 28 and 29 mounted upon and within the uprights 3. In the wall 26 surrounding the first disc 11 is a gap at 74 (Fig. 2) through which the fruit from the hopper 73 is fed on to the rotating disc 11, a floor piece 30 being provided between the edge of the hopper 73 and the disc 11. The disc 11 is provided with two girdles of holes, an outer girdle of smaller holes 31 and an inner girdle of larger holes 32. At the centre is an opening 33 large enough to pass the largest of the apples to be graded. From one side of the opening 74 in the surrounding wall 26 there runs a volute shaped guide 34, which first crosses the outer girdle of holes 31, then runs partway round the disc between the two girdles of holes and then crosses the inner girdle of holes 32 and partly surrounds the central opening 33. This volute shaped guide wall is held in position and carried by stays 35 mounted on opposite uprights 3. On the inside of the surrounding wall 26 are mounted flexible guides 36 which tend to move the apples in the rotating tray away from the side walls, and on the inner side of the volute guide 34 are mounted similar flexible guides for a similar purpose. As the apples are fed on to the rotating disc the smaller ones fall at once through the holes 31, the larger ones passing round with the disc until they are deflected by the inner side of the guide 34 over the inner girdle of holes 32, through which the next size of apples will fall, the remainder, which are too large, being finally guided by the inner end of the volute guide 34 through the central hole 33.

The apples which pass through the hole 33 drop through the funnel 38 (Fig. 7) on to the cushion 39 carried at the centre of the third disc or second grading disc 13, and these are dealt with in the manner described later on. The apples falling through the holes 31 and 32 respectively in the top disc are caught by the second or first collecting disc 12. In the wall 27 (Fig. 4) which surrounds this disc are openings 40 and 41, and from a point between these openings there runs a volute shaped stationary guide 42 towards the centre of the disc, and across the disc between the end of the guide 42 and the side of the opening 40 is a stopping wall 43. An inner wall 61 in the form of a sleeve is provided on the disc 12 fitting closely over the supports 10 and extending upwards to the underside of disc 11. The apples which fall through the holes 31 are caught by the disc 12 between the volute guide 42 and the wall 27, whilst those which fall through the holes 32 are caught by the disc 12 between the guide wall 42, and the sleeve 61 surrounding the supports 10 at the centre of the disc, the first size of apples passing out by the opening 41 on to an inclined platform 44 whence they pass to their collecting receptacle 64, and the second size of apples passing by the opening 40 on to an inclined platform 45 whence they pass into their collecting tray 46.

Upon the uprights 3 on either side of the opening 41 is mounted a plate 47 (Fig. 7). The shape of this plate is indicated in dotted lines in Fig. 2. Part of the plate lies close under the disc 11, bridging the space between the stopping wall 43 and the beginning of the volute guide 42 so that the smaller size of apple cannot drop through the openings 31 and pass off the disc 12 by the opening 40. Beneath the points in the disc 11 where the girdles of holes approach the volute guide 34 the edges of the plate 47 are inclined downwards so as to cause a gentle lift of any apples which may be resting in these holes.

The plate 47 is carried by inwardly extending arms 62 pivotally mounted at 65 upon the uprights 3, the outer ends being connected by springs 63 to the uprights 3 so that the plate 47 is maintained in position beneath the disc 11 by the pull of the said springs 63.

The plate 47 is formed with a narrow slit 66 in the inclined end at the part where it crosses the volute guide 42 so that said guide will not interfere with the slight up and down movement of the plate 47.

Above the disc 11 on the volute guide 34 and also at the points where the girdles of holes approach the said guide additional lifting means comprising covered bent strips 67 of the form shown in Figs. 11 and 12 are provided to co-operate with the blade 47 in lifting apples which may rest in the holes in the disc 11.

In the centre of the disc 12 is an opening 48 through which extends the funnel 38 on the disc 11. The apples which pass by the funnel 38 on to the cushion 39 roll off the one side of the round cushion 39, a suitable screen 49 being provided to ensure that they fall in the proper direction. From the cushion 39 the apples fall on to the disc 13, which is the third rotating disc in the machine and the second grading disc. This is furnished with two girdles of holes 50 and 51 of different size as can be seen from Fig. 5, and the apples are here further graded in the manner described with reference to the first grading disc, except that the apples move from the centre outwards a volute guide 52 running from the outside of the disc, across the outer girdle of larger holes, part-way round between the girdles and across the inner girdle towards the centre. Flexible guides 37 are here provided as in the first grading stage. The apples which do not pass through the holes 50 and 51 pass off by the opening 53 in the side wall 28 on to a stage 54, and these will be the fifth or largest size of apple. These apples which pass through the holes 50 and 51 fall on to the disc 14, the second collecting disc, by which they are collected separately and delivered through openings 55 and 56 in the side wall 29, passing on to inclined stages 57 and 58, whence they pass to their several receptacles. The volute guide 59 co-operates with the disc 14 in the manner described in connection with the preceding stages and beneath the holes 50 and 51 in the disc 13 is provided a lifting and masking plate 60 (Fig. 7) which is mounted in a similar way to and serves the same purpose as the plate 47 above described.

The devices 67 are also provided as before on the upper side of the disc for co-operating with the plate 60 in lifting apples which rest in the holes in the disc.

The manner in which the plates 47 and 60 serve to raise the fruit from engagement with the holes in the rotating discs is illustrated in Fig. 10.

The vertical supports 10 which carry the two upper discs may be covered with a sleeve 68 of soft material to prevent the fruit which rolls off the cushion 39 being damaged.

The surfaces of the discs and walls of the machine and the other surfaces which come in contact with the fruit may likewise be covered with a soft material to prevent the fruit being damaged.

The complete machine may for convenience be composed of three units, for example the central portion of the machine comprising the upright posts and the parts contained within them may form one unit, the feeding hopper and the collecting receptacles beneath it, and their supports, the second unit, and the collecting receptacles at the other end of the machine and their supports the third unit, the three units being assembled into a whole when mounted ready for use.

The collecting receptacles 46 and 64 may with advantage be each provided with one or more doors 69 for convenience in removing the graded fruit, while the receptacles at the opposite end of the machine are mounted in such a manner as to be readily removable when necessary. In the case illustrated (Fig. 1) the collecting trays 54 and 71 rest upon supports carried by a suitable framework 72. 70 are hasps or other securing means for holding the framework 72 in position upon the lower supporting frame 2.

It will be understood that the discs may readily be changed for other discs containing different sized holes so that different kinds of apples, for example, can be dealt with, or the machine may be adapted for grading other fruit than apples. The machine can of course be built to be run by power, instead of by hand, if desired.

I claim:

1. A fruit grading machine comprising a rotating grading disc having a zone of apertures therein and a central aperture within said zone and of larger diameter than the apertures in the zone, and stationary guiding means adapted to feed the fruit across the zone of apertures in the rotating disc towards the central aperture.

2. A fruit grading machine comprising a rotating grading disc having a number of zones of apertures therein of different size, and stationary guiding means adapted to feed the fruit first across the zone of smaller apertures and then across the zone of next larger apertures.

3. A fruit grading machine comprising a rotating grading disc having a number of concentric zones of apertures therein of different size, and stationary guiding means adapted to feed the fruit first across the zone of smaller apertures and then across the zone of next larger apertures.

4. A fruit grading machine comprising a substantially horizontal rotating perforated grading disc and a stationary guiding wall substantially in the form of a volute adapted to feed the fruit across and around the rotating disc.

5. A fruit grading machine comprising a rotating guiding disc having an outer zone of apertures of given size and an inner zone of apertures of larger size, and a central aperture of a still larger size and a stationary guiding wall substantially in the form of a volute, which first crosses the outer zone of apertures in the grading disc, then runs between the outer zone and the inner zone and then crosses the inner zone of apertures.

6. A fruit grading machine comprising a substantially horizontal rotating perforated grading disc, spiral means adapted to guide the fruit across and around said grading disc, and a collecting and delivering disc beneath said grading disc onto which falls the fruit which passes through the apertures in the grading disc.

7. A fruit grading machine comprising a rotating perforated grading disc, means adapted to guide the fruit across said grading disc, a collecting and delivering disc beneath said grading disc onto which falls the fruit which passes through the apertures in the grading disc and means adapted to guide the fruit falling on said collecting disc across the said disc.

8. In a fruit grading machine, a rotating grading disc having two zones of apertures therein, a rotating collecting disc beneath said grading disc and a stationary guide wall co-operating with said collecting disc and so disposed and shaped that the fruit passing respectively through the two zones of apertures in the grading disc falls on opposite sides of the said guide wall.

9. In a fruit grading machine a rotating perforated grading disc having a central aperture and a collecting disc rotating beneath said grading disc, having a central aperture through which will also pass the fruit passing through the centre of the grading disc.

10. In a fruit grading machine, in combination with the features claimed in claim 9, a second rotating grading disc beneath the collecting disc.

11. In a fruit grading machine, a rotating grading disc, a stationary wall partly surrounding said disc and flexible guide members on said stationary wall adapted to cause the fruit to move away from said stationary wall.

12. In a fruit grading machine, a rotating, perforated grading disc, guiding means on said disc for conducting the fruit across the line of travel of the holes in the disc, a stationary inclined plate beneath said disc for removing the fruit lodged in said perforations.

13. In a fruit grading machine, a rotating, perforated grading disc, spiral guiding means on said disc for conducting the fruit across the line of travel of the perforations in said disc, a stationary inclined resilient plate beneath said disc, adapted to remove the fruit lodged in any of the perforations.

14. In a fruit grading machine, a rotating perforated grading disc, a stationary guide wall adapted to guide the fruit across the line of travel of the holes in said grading disc and means on said guide wall adapted to lift out and away from the holes in the grading disc any fruit which is lodged in and above said holes.

15. In a fruit grading machine a rotating perforated grading disc, having a central aperture, a collecting disc rotating beneath said grading disc and also having a central aperture, and cushioning means onto which the fruit passing through the two said apertures falls.

16. In a fruit grading machine, a perforated grading disc, having a central opening therein, a collecting disc beneath said grading disc, a single rotating support for both of said discs, and a stationary spiral guide wall on said grading disc for conducting the fruit across said disc, from the outside towards the central opening in said disc.

17. A fruit grading machine comprising a rotating, perforated grading disc having an enlarged central opening, a spiral wall conducting the fruit across the disc from the outside to the central opening, a rotating collecting disc beneath said grading disc, and a voluted guide means for carrying the fruit that passes through the perforations in the grading disc to an outlet.

18. A fruit grading machine comprising a rotating, perforated grading disc having an enlarged central opening, a spiral wall conducting the fruit across the disc from the outside to the central opening, means beneath said grading discs for preventing fruit from lodging in the perforations, a rotating collecting disc beneath said grading disc, and a voluted guide means for carrying the fruit that passes through the perforations in the grading disc to an outlet.

19. A fruit grading machine comprising a rotating, perforated grading disc having an enlarged central opening, a spiral wall conducting the fruit across the disc from the outside to the central opening, a rotating collecting disc beneath said grading disc, and a voluted guide means for carrying the fruit that passes through the perforations in the grading disc to an outlet, a second grading disc beneath said collecting disc having perforations therein, means conducting the fruit from the central opening in the first mentioned grading disc to said second grading disc, and a second collecting disc beneath said second grading disc having a convoluted means for conducting the fruit to an outlet.

20. A fruit grading machine comprising a rotating, perforated grading disc having an enlarged central opening, a spiral wall conducting the fruit across the disc from the outside to the central opening, a rotating collecting disc beneath said grading disc, and a voluted guide means for carrying the fruit that passes through the perforations in the grading disc to an outlet, a second grading disc beneath said collecting disc having perforations therein, means conducting the fruit from the central opening in the first mentioned grading disc to said second grading disc, a second collecting disc beneath said second grading disc having a convoluted means for conducting the fruit to an outlet.

In testimony whereof I hereunto affix my signature in the presence of two witnesses.

FREDERICK BOWMAN PURCHAS.

Witnesses:
JOHN HENRY RUSSON,
LOVETT W. REDDIE.